P. B. TYLER, W. M. CHANDLER & L. F. STANDISH.

Assignors, by mesne assignments, to G. SELDEN.

Pocket Lighting Device.

No. 8,490. Reissued Nov. 12, 1878.

WITNESSES

Franck L. Durand

Alexander Mahon

By his Attorney

Geo. Selden, agt &c. of

Tyler, Chandler & Standish

INVENTORS.

A. M. Smith

N. PETERS, PHOTO-LITHOGRAPHER, WASHINGTON, D. C.

UNITED STATES PATENT OFFICE

GEORGE SELDEN, OF ERIE, PA., ASSIGNEE, BY MESNE ASSIGNMENTS, OF PHILOS B. TYLER, WM. M. CHANDLER, AND L. F. STANDISH.

IMPROVEMENT IN POCKET LIGHTING DEVICES.

Specification forming part of Letters Patent No. 50,860, dated November 7, 1865; Reissue No. 7,927, dated October 23, 1877; Reissue No. 8,490, dated November 12, 1878; application filed November 2, 1878.

*To all whom it may concern:*

Be it known that PHILOS B. TYLER, WILLIAM M. CHANDLER, and L. F. STANDISH, did invent certain new and useful Improvements in Pocket Lighting Devices, of which the following is a full, clear, and exact description, reference being had to the accompanying drawings, making part of this specification, in which—

Figure 2:
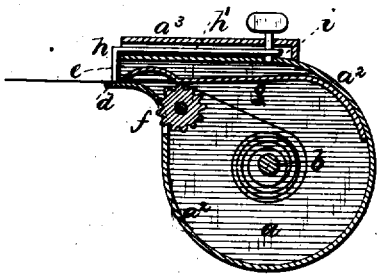
Figure 1:
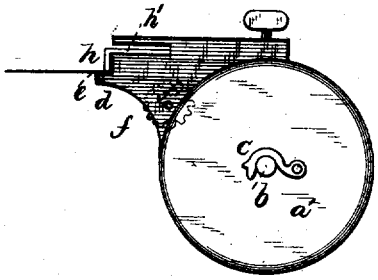
Figure 4:
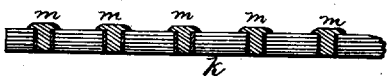
Figure 3:
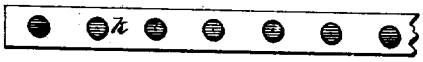

Figure 1 is a side elevation of the lighter. Fig. 2 represents the same in section. Fig. 3 is a rear view of a portion of one of the repeating-matches employed, and Fig. 4 represents a longitudinal section through the same.

Similar letters of reference denote corresponding parts wherever used.

The invention relates to a novel lighter for carrying in the pocket, consisting of a case or shell adapted to inclose and protect a continuous or repeating match, and provided with appliances permanently attached to it for feeding and igniting the match, as hereinafter explained.

In the accompanying drawings, $a$ $a^1$ represent a case or shell, made in the form of a shallow box, one side or plate, $a$, thereof being provided on its edge with a flange or rim, $a^2$, forming a chamber or magazine for containing the repeating match or tape, which, when in place, is covered by a hinged or removable cover, $a^1$.

The plate or side $a$ has a pin or arbor, $b$, secured to it, arranged about central to the magazine or chamber, and projecting through a perforation in the cover $a^1$; and a hook, $c$, pivoted on the cover $a^1$, and engaging with the projecting end of the pin or arbor $b$, serves to hold the cover in place.

Figs. 1 and 2 of the drawing show a convenient form of case for general use, representing it as approximating a circular form, or rather that of a short cylinder, provided with what may be termed an "eccentric extension" and an opening or outlet through the same at $e$, through which the repeating-match is fed outward, as desired. One wall of this outlet $e$ extends slightly beyond the other, and forms a projecting lip or nose-piece, $d$, over which the repeating-match passes as it is fed outward, said lip or nose-piece serving to support the match directly against the action of the igniting device.

At a point near the outlet-passage $e$ the case or shell $a$ is provided with a toothed wheel, $f$, or equivalent device, for feeding the match outward, the shaft of said wheel being journaled in the side walls or plates of the case or outlet-passage, as shown at $f'$. On the inner side of the flange or rim $a^2$, opposite to the wheel $f$, is secured a spring, $g$, which overhangs the feed-wheel $f$, and serves as a guiding-apron for holding the repeating-match or tape in contact with the wheel, insuring the endwise or feeding movement of said match or tape between the two when the wheel is rotated.

Directly over the nose-piece $d$ is a device, $h$, for igniting the repeating-match, consisting of an angular lip or projection on a vibrating arm, $h'$, which, at its rear end, is rigidly connected with a rock-shaft or pin, having its bearings in the case $a$ or walls $a^2$ $a^3$, and provided with a handle or thumb-piece on its outer end, outside of the case or shell, by means of which the igniting device $h$ may be operated for igniting the match.

The vibrating arm $h'$ is inclosed and protected by being placed within a compartment or chamber, $i$, as shown.

The lighter-case thus constructed is designed to inclose and protect a match composed of a strip of paper or tape, $k$, provided either with a continuous strip of igniting material or with such material arranged in spots or pellets at regular intervals in its length, as shown at $m$, Figs. 3 and 4, and which, for adapting it to be placed in compact shape in the case $a$, is rolled up, as shown in Fig. 2.

Any suitable kind or preparation of igniting material may be used upon the tape or strip of paper, and, where it is used in connection with a tape or wick of other material than paper, said wick or tape may be saturated with stearine or other suitable material, adapting it to be readily ignited by the igniting pellets or strip.

In operation, the wick or tape is fed outward by means of the wheel $f$ until a pellet or portion of the igniting material rests on the nose-piece *d*, when it is ignited by the vibration of the arm *h'* and igniting device *h*, and in turn serves to ignite the wick or tape, which may then be used for any purpose to which it is applicable.

The wick will continue to burn as long as any portion of it projects beyond the outlet-passage *e* or nose-piece *d*, and may be fed outward and allowed to burn as long as required, when, by withdrawing it, or allowing it to burn until all that projects is consumed, the air will be excluded from the remaining portion and the fire will be extinguished.

The operation may be repeated until the entire repeating-match is consumed, when, by removing the cover $a^1$ or opening the case *a*, a new match or tape may be inserted.

Having now described the invention of the said TYLER, CHANDLER, and STANDISH, I would state that I do not wish to be limited to any particular igniting material in the manufacture of the repeating-match, nor to the use of a tape or wick saturated with stearine, as any suitable material may be employed, both for igniting the wick or tape and saturating the same, such as will adapt it to be readily ignited; nor do I wish to be limited to the specific form of case shown, nor to the particular construction and arrangement of the devices for feeding and igniting the repeating-match, the form and arrangement shown being such, however, as to adapt the lighter to general use, and constituting a convenient and compact form for carrying in the pocket.

Having now described the invention, what I claim as new, and desire to secure by Letters Patent, is—

1. In a pocket lighting device, a magazine, case, or shell for inclosing the strip or coil of repeating-match, provided with a lip or nose-piece, projected beyond the outlet opening or passage for the match, and serving to uphold the match against the action of the igniting device.

2. In a pocket lighting device, a magazine, case, or shell for containing a repeating-match, provided with a lip or nose-piece, substantially as described, for upholding the match and an igniting device, between which and the lip or nose-piece the match is ignited.

3. In a pocket lighting device, a magazine, case, or shell for containing the strip or coil of repeating-match, provided with an outlet opening or passage for said match, and a lip or nose-piece projected beyond said outlet on a line parallel, or nearly so, with the line of feed of the match.

4. In a pocket lighting device, a magazine, case, or shell, with a lip or nose-piece for upholding the repeating-match against the action of the igniting device, and over which the match is fed outward, in combination with an igniting device arranged parallel, or nearly so, with the duct or passage through which the wick or match passes to be ignited.

5. In a pocket lighting device, the combination of a magazine, case, or shell for inclosing a strip or coil of repeating-match, a nose-piece extending beyond the outlet therefor in the magazine, case, or shell, a permanently-attached igniter, acting, in conjunction with said nose-piece, to effect the ignition of the repeating-match, and a device for feeding the repeating-match over the nose-piece.

6. The combination, in a pocket lighting device, of an inclosing case, shell, or magazine, a strip or coil of repeating-match, a lip or nose-piece, substantially as described, for upholding said match against the action of the igniting device, a toothed wheel or equivalent device for feeding the match over the nose-piece, and a permanently-attached igniter, between which and the nose-piece the match is ignited.

GEO. SELDEN.

Witnesses:
E. P. SELDEN,
JNO. H. BLISS.